L. WIGHT & O. G. EWINGS.
Improvement in Corn-Planters.
No. 129,383.  Patented July 16, 1872.
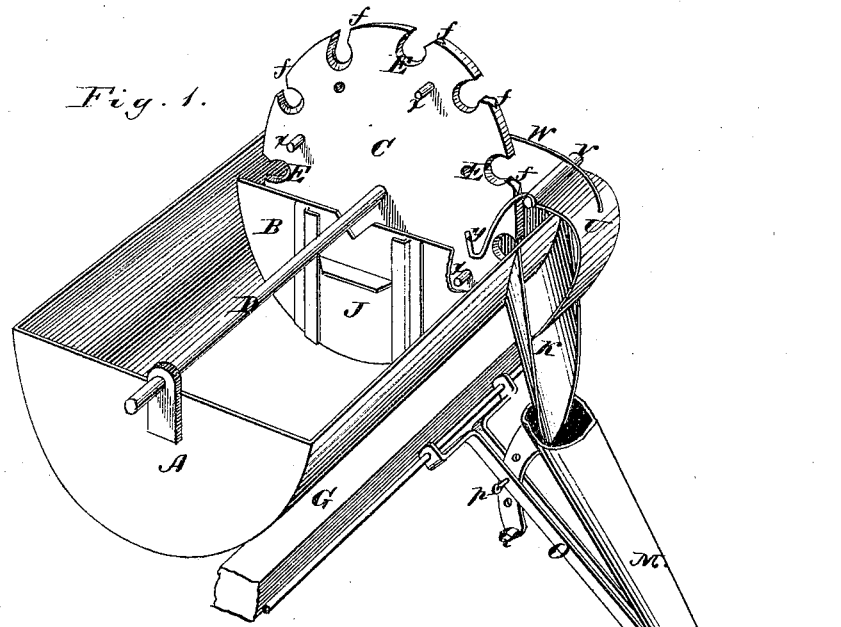
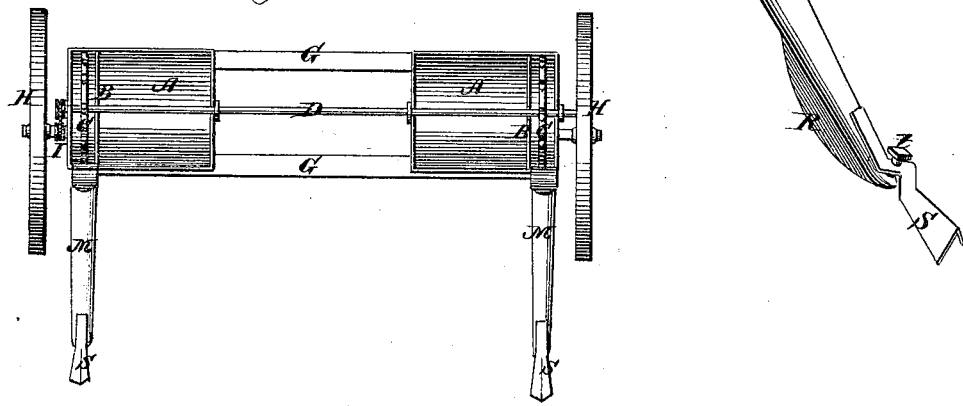
Witnesses.
Inventors.

UNITED STATES PATENT OFFICE.

LYMAN WIGHT, OF WHITEWATER, AND ORISON G. EWINGS, OF LA GRANGE, WISCONSIN.

IMPROVEMENT IN CORN-PLANTERS.

Specification forming part of Letters Patent No. 129,383, dated July 16, 1872.

*To all whom it may concern:*

Be it known that we, LYMAN WIGHT, of Whitewater in the county of Walworth and State of Wisconsin, and ORISON G. EWINGS, of La Grange, in the county of Walworth and State of Wisconsin, have invented a new and Improved Corn-Planter; and we do hereby declare the following to be a full, clear, and exact description of the same, reference being had to the accompanying drawing forming part of this specification, in which—

Figure 1 is a perspective view of the dropping mechanism, and Fig. 2 a plan view, showing its application to a suitable supporting-frame.

Similar letters of reference in the accompanying drawing denote the same parts.

Our invention has for its object to provide for public use more complete and efficient means for planting corn both in hills and in drills. To this end the invention consists, first, in a wheel placed within the hopper of the machine so as to rotate in a vertical plane, and having its periphery formed or provided with suitable notches, buckets, or receptacles, each of which shall lift a single grain of corn and discharge it from the hopper as the wheel rotates, for the purpose of planting continuously in drills, or for planting in hills at intervals. The invention also consists in combining a dropping device with the lifting-wheel, which shall receive the seed from the latter and discharge it at intervals for planting in hills, the dropping device being operated automatically from the wheel, and provision being also made for regulating the quantity of seed to be dropped in each hill.

In the accompanying drawing, A is the hopper, made concave or semi-cylindrical in form, as shown, and divided into two compartments by a transverse partition, B, near one end. C is the lifting-wheel, placed within the smaller compartment, and mounted upon the horizontal shaft D, which has its bearings in or upon the ends of the hopper. The diameter of the lifting-wheel should be nearly equal to that of the hopper, so as to rotate within the latter with close contact, or so as to leave but a small space between them. E are circular recesses made in the periphery of the lifting-wheel, at regular distances apart; and *f* are notches formed in one of the angles produced by each recess. The several notches are arranged upon the same side of the recess and parallel to the plane of the wheel. In practice we propose to use two hoppers and two lifting-wheels upon a suitable frame, G, a hopper and wheel being placed at each end thereof, and the two wheels being mounted upon the same shaft D, which is driven by any suitable arrangement of mechanism from the supporting-wheels H of the frame. In the drawing we have shown an arrangement by which this is accomplished, consisting of a pulley upon the hub of one wheel, H, connected by a belt, I, with a pulley upon the end of the shaft D outside the hopper.

When it is desired to operate the lifting-wheels, the larger compartment of each hopper is filled with corn, and the gates L in the partitions B raised slightly to permit the required quantity of grain to flow into the smaller compartment containing the lifting-wheels. The machine is now set in motion, and as the wheels C rotate, each notch *f* in succession lifts a kernel of corn and discharges it over the side of the hopper into an inclined spout, K, affixed to the outside of the latter, from which it either flows directly to the ground or into the drill-tube M. In this manner the corn is drilled into the ground one kernel at a time. The notches *f* occupy such an angle with respect to the diameter of the wheels that the corn will readily drop from them when they have reached the edge of the hopper. The corn cannot be carried up by the recesses E, because the curvature of the latter causes the kernels to drop back as the recesses rise out of the corn in the hopper.

M are the drill-tubes attached to a rod, N, upon the frame of the machine by means of bifurcated arms O, whose lower ends are pivoted to the inner side of the drill-tubes a short distance from the upper end thereof. The drill-tubes are adjusted to the requisite inclinations by pins *p* in the arms O and the perforated segments Q, which project downward through said arms from the upper ends of the tubes. Colters R are formed upon the lower ends of the drill-tubes, having their rear ends divided to open the ground for the reception of the seed. Over each colter, at the rear of the tubes, is located a scraper, S, by which the grain is covered, and these scrapers are adjusted by set-screws $t$ to regulate the depth at which the grain is sown.

For the purpose of dropping the corn in hills after it has been discharged from the lifting-wheel, we preferably employ the following arrangement of mechanism. This, however, may be varied to any extent without departing from our invention. U is a curved plate of metal, hinged at its upper end upon a short shaft, $v$, projecting from the hopper above the spout K. The lower end of the plate is rounded to fit within the spout, and is held therein by the spring $w$, as shown. $x\ x$ are pins projecting from one side of the lifting-wheel, and $y$ is an arm extending from the upper end of the plate U to the side of said wheel, and within the path of the pins. As the corn falls from the lifting-wheel it is retained within the spout K by the plate until a sufficient quantity has accumulated to form a hill, when the lower end of the plate is lifted by the contact of the arm $y$ with a pin, $x$, and the corn discharged into the drill-tubes. The spring $w$ throws the plate quickly back to its position when the pins $x$ and arm $y$ have cleared each other. By changing the number of pins in the lifting-wheel the plate is lifted at longer or shorter intervals, to regulate the quantity of seed to be sown in each hill. By this arrangement the corn is planted in hills automatically, and in the most complete and thorough manner.

We design to apply the lifting-wheel and hopper to any suitable frame or support for dropping small grain and other seeds, as well as for planting corn, and to use the dropping device at the lower ends of the planter-tubes, if preferred, operating it either by the mechanism above described or by hand.

Having thus fully described our invention, what we claim as new is—

1. A lifting and dropping wheel for corn-planters, constructed to lift the grain by single kernels to the level of its own axis and discharge it from that point over the edges of the hopper, substantially as described, for the purposes specified.

2. The lifting-wheel C, constructed with the peripheral recesses E, and with the notches $f$ formed in one of the angles of each recess parallel to the plane of the wheel, substantially as described, for the purposes specified.

3. In combination with the wheel C, constructed to lift the grain by single kernels to the level of its own axis and discharge it from that point, we claim a dropping device operated automatically from such wheel, substantially as described, for the purposes specified.

4. In combination with the hopper B, spout K, and lifting-wheel, we claim the spring-dropper U, substantially as described, for the purpose specified.

5. The spring-dropper U operated automatically from the lifting-wheel, substantially as described, for the purpose specified.

LYMAN WIGHT.
ORISON G. EWINGS.

Witnesses for both signatures:
SYLVESTER HANSON,
REBECCA D. HANSON.